United States Patent [19]

Ellis et al.

[11] Patent Number: 4,712,864
[45] Date of Patent: Dec. 15, 1987

[54] MULTI-CHANNEL FIBER OPTIC CONNECTOR

[75] Inventors: Roger H. Ellis, Atherton; John W. Alyea, San Carlos, both of Calif.

[73] Assignee: Luxtron Corporation, Menlo Park, Calif.

[21] Appl. No.: 730,669

[22] Filed: May 2, 1985

[51] Int. Cl.⁴ .............................................. G02B 6/40
[52] U.S. Cl. .............................. 350/96.22; 350/96.21
[58] Field of Search .............. 350/96.20, 96.21, 96.22, 350/320

[56] References Cited

U.S. PATENT DOCUMENTS

| | | | |
|---|---|---|---|
| 4,142,776 | 3/1979 | Cherin et al. | 350/96.21 |
| 4,220,619 | 9/1980 | Kersten | 350/96.21 X |
| 4,405,200 | 9/1983 | Hoffmann et al. | 350/96.21 |
| 4,562,632 | 1/1986 | Parchet et al. | 350/96.21 X |

FOREIGN PATENT DOCUMENTS

| | | | |
|---|---|---|---|
| 2734796 | 2/1978 | Fed. Rep. of Germany | 350/96.21 |
| 53-70835 | 6/1978 | Japan | 350/96.21 |
| 54-34251 | 3/1979 | Japan | 350/96.22 |

*Primary Examiner*—John Lee
*Attorney, Agent, or Firm*—Majestic, Gallagher, Parsons & Siebert

[57] ABSTRACT

A connector for connecting two groups of optical fibers in axial alignment comprises a receptacle having therein a bore extending through it for holding therein two plugs, one on each side. The surface of the bore has two flat portions, one at each end. The portions of the plugs to be inserted into the bore also have flat portions shaped to contact the flat portions of the bore surface. The three interference bosses on the plugs are positioned such that after the plugs are inserted into the bore the bosses force the flat portion of the plug against the flat portion in the receptacle so that rotation of the plugs relative to the receptacle is prevented and the two plugs are substantially fixed in position relative to each other. Each plug assembly includes a ferrule having therein a passage and whose cross-section is triangular, square, polygonal or star-shaped. The plug assembly includes an insert shaped to press fit into the passage forming triangular spaces between the insert and the passage surface. The optical fibers are fixed into the triangular spaces. The triangular spaces between the insert and the ferrule of each plug are preferably tapered to facilitate the insertion of the fibers into the spaces. Each of the two groups of optical fibers fixed in the triangular space is positioned relative to the flat portions of the two plugs so that after the two plugs are inserted into the bore, the two groups of optical fibers are axially aligned.

17 Claims, 16 Drawing Figures

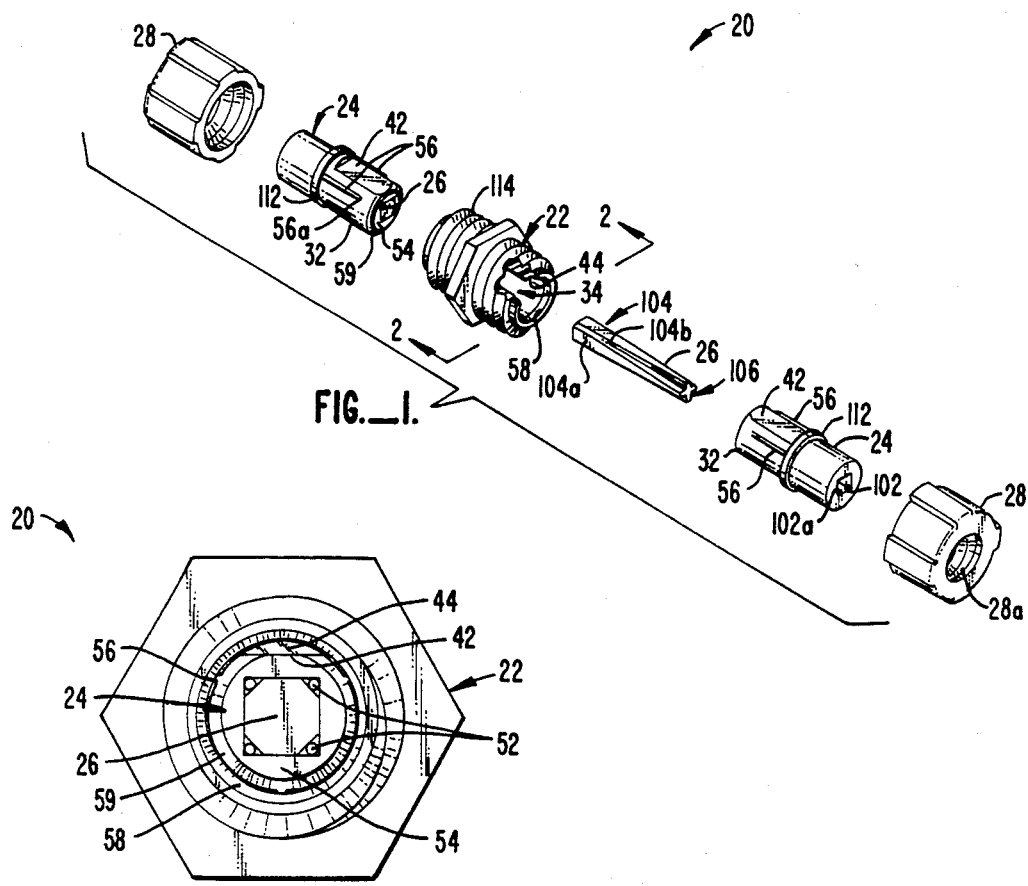
FIG._1.
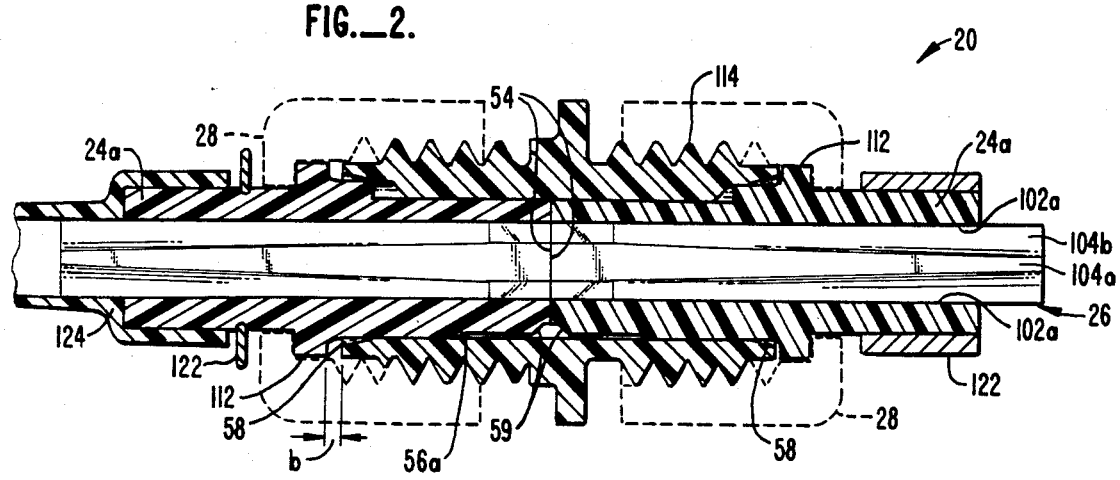
FIG._2.
FIG._3.

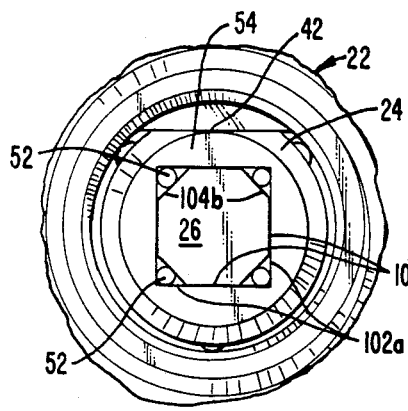
FIG._4.
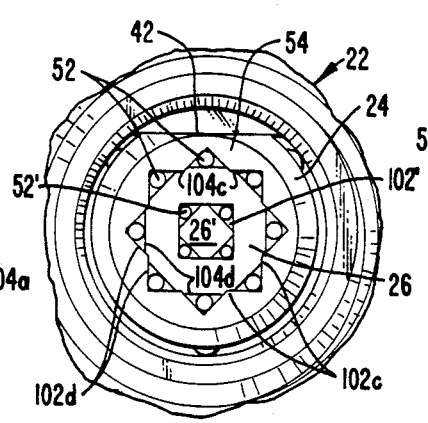
FIG._6.
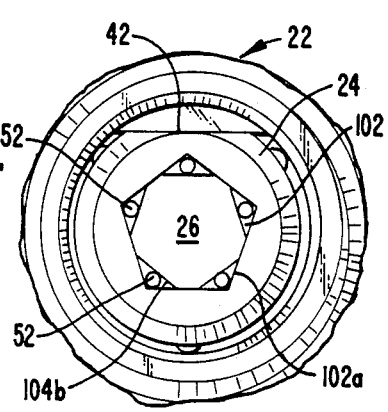
FIG._5.
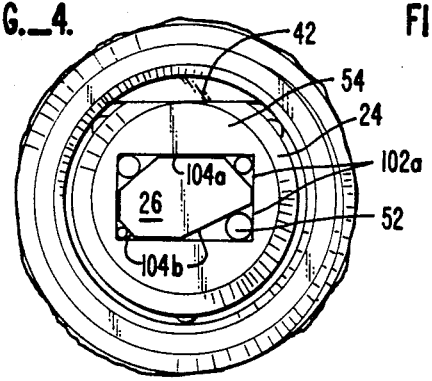
FIG._7.
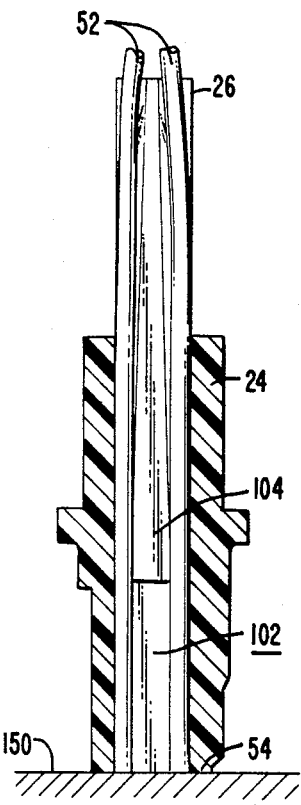
FIG._8C.
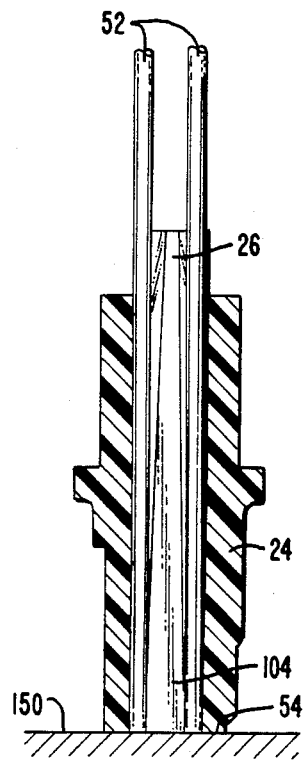
FIG._8D.

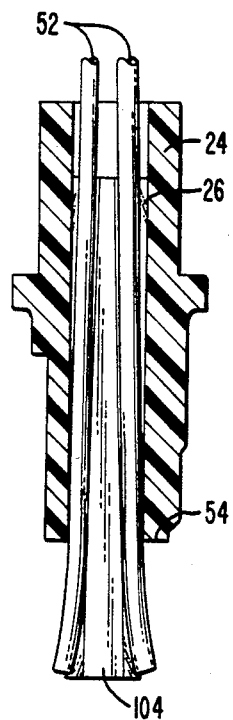 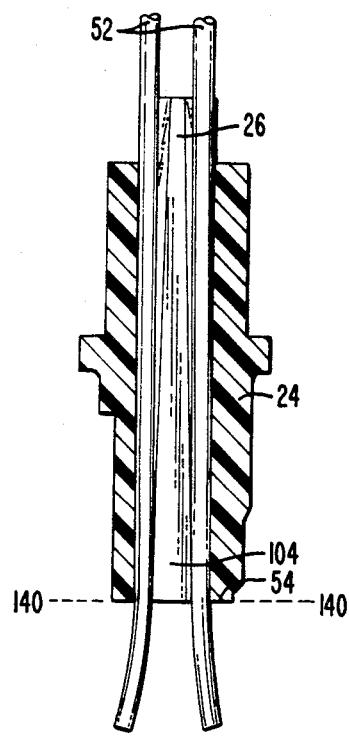
FIG._8A.  FIG._8B.

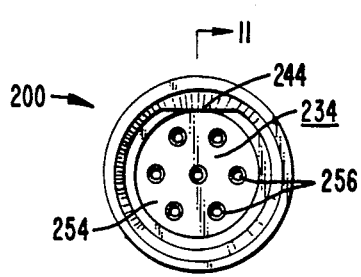
FIG._9.
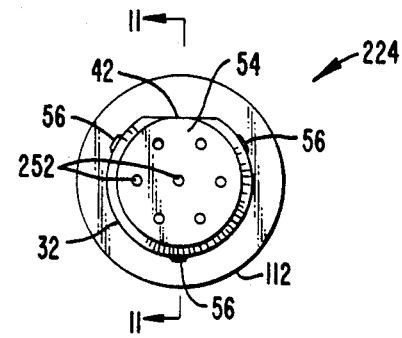
FIG._10.
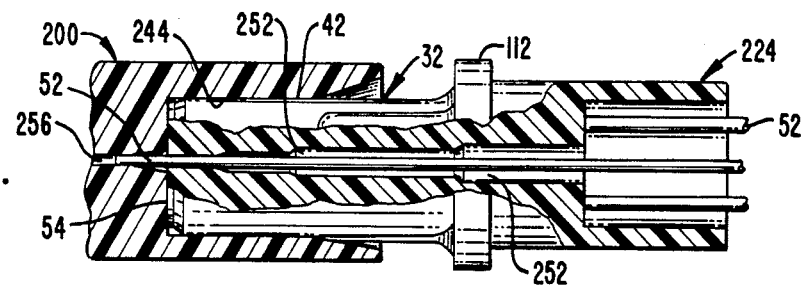
FIG._11A.
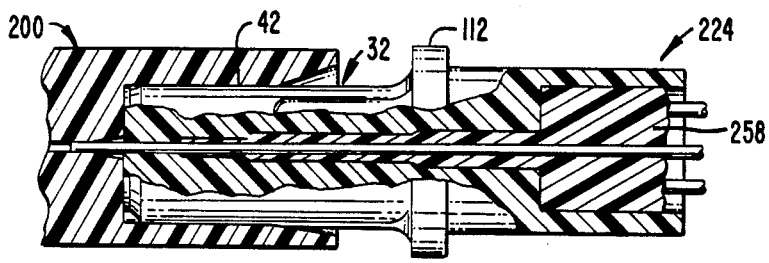
FIG._11B.
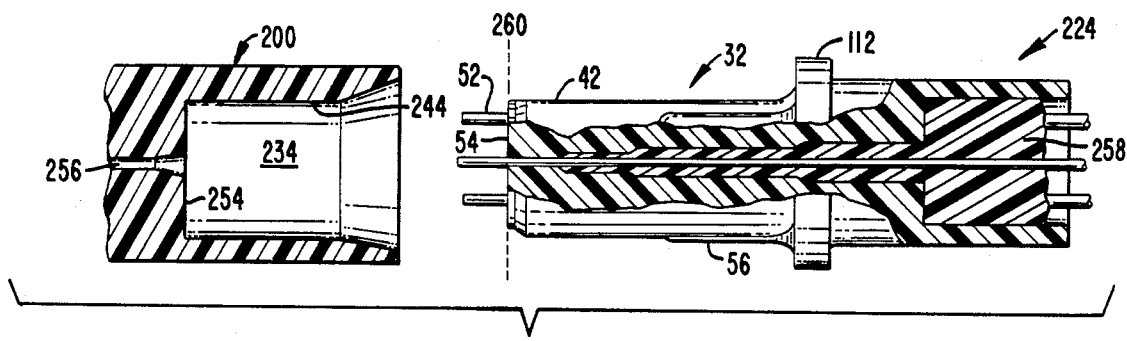
FIG._11C.

MULTI-CHANNEL FIBER OPTIC CONNECTOR

BACKGROUND OF THE INVENTION

This invention relates in general to fiber optic connectors and in particular to multi-channel fiber optic connectors for connecting more than one pair of fibers.

Optical fibers used for data transmission are made with a circular core of either glass or plastic encoated with a cladding material having a lower index of refraction than the core. When the ends of two optical fibers are connected it is important for the cores of the two fibers to be aligned to maximize the amount of light signal transmitted from the end of one fiber to the end of the other. If the two fibers are not aligned the magnitude of the light signal transmitted is reduced. As the ends of the two fibers move further away from the perfectly aligned position the magnitude of the light signal transmitted continues to decrese. Optical fibers used for data transmission frequently have cores with very small diameters typically of the order of a hundred microns. Thus, connectors for connecting single pairs of optical fibers in end-to-end relationship must be capable of aligning accurately the ends of a pair of fibers with small diameters.

Frequently, it is necessary to connect together the ends of more than one pair of optical fibers. If a single channel fiber optic connector is used to connect each pair of fibers, then a number of connectors will be necessary. To connect or disconnect the pair of fibers, it is necessary to connect and disconnect each connector which may be inconvenient. In applications where the amount of space available for the connections is limited, the use of single channel fiber optic connectors may be altogether impractical. Thus, it is desirable to provide multi-channel fiber optic connectors comparable in size to single channel connectors but which are capable of simultaneously connecting and aligning more than one pair of optical fibers.

Multi-channel fiber optic connectors, however, have much more stringent requirements for tolerances than single channel connectors. Because of space considerations, it may be desirable for multi-channel connectors to be be capable of aligning accurately two or more pairs of fibers and yet are compact so that they are comparable in size to single channel connectors. The larger the number of pairs of fibers that must be aligned, the tighter will be the tolerance for the multi-channel connector. Thus, multi-channel connectors can be difficult to manufacture and are usually expensive.

Attempts have been made to design multi-channel fiber optic connectors. In one type of multi-channel connectors one or more alignment pins are provided in one part of a connector which fit into one or more corresponding holes in the other part of the connector to align the ends of two sets of optical fibers. The use of alignment pins and complementary holes are disclosed in U.S. Pat. Nos. 3,923,371 to Dalgleish, 4,076,379 to Chouinard and 4,396,248 to Bientz et al. A form of alignment pin-complementary hole type connection for aligning the fibers is also used in U.S. Pat. No. 4,405,201 to Cefarelli et al.

In another type of multi-channel optical fiber connector the connector includes an alignment member having two surfaces inclined twoards each other in the form of a V and two oppositely situated ferrules resting on the two surfaces. The fibers and the two ferrules are then aligned by the two surfaces forming the V. This type of connection is disclosed in U.S. Pat. No. 4,258,977 to Lukas et al. UK Pat. No. 1 576 336 also employs V shaped channels in two different holders for aligning two fibers each placed in one of the holders. The V shaped channels are such that the fibers are offset relative to the axes of the holders. The two holders are then rotated relative to each other about the axes and the position of maximum light transmission from one fiber to the other is determined to align the ends of the fibers.

None of the above described multi-channel connectors are entirely satisfactory. In the type of connector utilizing an alignment pin and a complementary hole, the size of the hole must be larger than the pin so that the pin may be inserted therein. Thus, the pin may contact the hole surface at only one point allowing the pin to move about in the hole which changes the alignment of the fibers. It is thus desirable to provide a multi-channel fiber optic connector which provides better alignment capabilities, is inexpensive and which may be used to connect and disconnect a number of optical fibers repeatedly.

SUMMARY OF THE INVENTION

The invention is directed to a multi-channel fiber optic connector which is polarized to accurately align a number of optical fibers. It is compact, easy to assemble and inexpensive so that it is disposable.

The connector of the invention connects a first and a second group of optical fibers in axial alignment. The connector comprises a receptacle means having therein a bore having a surface defining a first surface which includes a flat portion. The receptacle means is adapted for connection with the first group of one or more optical fibers so that the ends of the fibers are substantially fixed in position relative to the flat portion of the first surface. The connector further comprises a first plug means at least a portion of which is shaped to fit into the bore of the receptacle. The outside surface of the plug means defines a second surface which includes a flat portion shaped to contact the flat portion of the first surface. The plug means is adapted for connection with a second group of one or more optical fibers so that the ends of the fibers in the second groups are substantially fixed in position relative to the flat portion of the second surface. One of the first and second surfaces has one or more bosses thereon for contacting the other surface so that when the plug means is inserted into the bore of the receptacle means, the flat portions of the first and second surfaces will contact and be urged against each other to connect the two groups of fibers and to align each of the ends of one or more fibers in the first group with an end of a fiber in the second group. Rotation of the plug means relative to the receptacle means is thereby also prevented or reduced.

In the preferred embodiment, the bore in the receptacle extends through it for holding therein two plug means of the type described above, one on each side, and the bore has two flat portions on its surface. The first and second groups of optical fibers are each terminated in one of the plug means, and the two groups are connected by inserting both plug means into the bore, one on each side. After being inserted into the bore, the flat portion of the outside surface of each plug means is urged towards the corresponding flat portion on the inside surface of the bore by bosses, the two flat portions on the bore surface being aligned to align the two groups of fibers. The two plug means need not be the same. The connector may also be used for connecting two groups of fibers of different sizes. In the preferred embodiment, the bosses have larger dimensions than the separation between the plug means so that the interference between then and the bore surface causes the bosses to act as springs urging the contacting flats together to reduce rotational or other relative movements and to accurately align the fibers. In the preferred embodiment, coupling nuts complementarily shaped for engaging the receptacle are used to overcome friction between the plug means and the bore surface when the plug means are inserted into the bore.

The plug means of this invention includes a ferrule member having therein a passage and whose cross-section is either substantially star-shaped or substantially in the shape of a polygon. The corners of the polygon or the projecting points of the star-shape each represents the line of intersection of two inclined surfaces of the passage, the two inclined surfaces forming an angular surface corresponding to the corner or the projecting point. Each anglular surface is for engaging an optical fiber therein. The plug means further includes an insert member shaped to fit into the passage. The surfaces of the insert member facing the passage include two or more types of surfaces. Each surface of the first type corresponds to each angular surface and is for engaging the optical fiber when the insert member has been inserted into the passage. The second type of surfaces is for engaging the surfaces of the passage. The optical fibers are inserted into the spaces between the angular surfaces and the corresponding surfaces of the first type to align the fibers relative to the ferrule member.

The first type of surfaces of the insert member is tapered so that the spaces between the insert member and the angular surfaces are also tapered to facilitate the insertion of fibers into the spaces. The ferrule member has a mating end which has a mating surface for connection with another connector component. To connect a group of optical fibers in axial alignment with respect to the ferrule member, the insert member is inserted into the passage in the ferrule member with the narrower end of the spaces between the insert and the passage surface at the mating end and until the insert member protrudes beyond the mating surface of the ferrule. One or more optical fibers are inserted into the tapered spaces between the angular surfaces and the corresponding surfaces of the first type. Lastly, the insert member is pushed back into the passage until the protruding end is flush with the mating surface. The fibers are then cut so that they are substantially flush with the mating surface of the mating end of the ferrule.

BRIEF DESCRIPTION OF THE DRAWINGS

FIG. 1 is an exploded perspective view of a multi-channel fiber optic connector with a receptacle, a pair of plug ferrules each having an insert and a pair of coupling nuts, illustrating the preferred embodiment of the invention.

FIG. 2 is an elevational view of the receptacle and ferrule of FIG. 1 after they have been mated together with 4 optical fibers viewed along the lines 2—2 of FIG. 1.

FIG. 3 is a partially cross-sectional and partially elevational view of the receptacle and the two ferrules showing the positions of the two ferrules after they have been mated into the receptacle to connect the fibers (not shown).

FIG. 4 is an enlarged view of a portion of the receptacle and ferrule of FIG. 2.

FIG. 5 is an enlarged view of a portion of the receptacle and ferrule of FIG. 2, with the chamber in the ferrule and the insert modified in shape to illustrate an alternative embodiment for the ferrule.

FIG. 6 is an enlarged view of a portion of the receptacle and ferrule of FIG. 2, with the chamber in the ferrule and the insert modified in shape to illustrate a second alternative embodiment for the ferrule.

FIG. 7 is an enlarged view of a portion of the receptacle and ferrule of FIG. 2, with the chamber in the ferrule and the insert modified in shape to illustrate a third alternative embodiment for the ferrule.

FIGS. 8A and 8B are partially cross-sectional views and partially elevational views of a ferrule and insert and four optical fibers illustrating a preferred method for connecting optical fibers to the connector.

FIGS. 8C and 8D are partially cross-sectional views and partially elevational views of a ferrule and insert and four optical fibers illustrating an alternative method for connecting optical fibers to the connector.

FIG. 9 is an elevational view of a connector fixture for precisely aligning a number of optical fibers with respect to a ferrule.

FIG. 10 is an elevational view of a ferule.

FIGS. 11A, 11B and 11C are cross-sectional views of the fixture element and the ferrule of FIGS. 9, 10 in different relative positions with the cross-sections taken along the lines 11—11 in FIGS. 9 and 10.

DETAILED DESCRIPTION OF THE PREFERRED EMBODIMENT

FIG. 1 is an exploded perspective view of a multi-channel fiber optic connector 20 with a receptacle 22, a pair of plug ferrules 24 each having an insert 26 and a pair of coupling nuts 28. Thus, as shown in FIG. 1 connector 20 has a symmetrical construction. In the preferred embodiment as shown in FIG. 1 connector 20 connects the corresponding ends of two sets of 4 optical fibers. Each of the two plug ferrules 24 are connected to the ends of a set of 4 optic fibers by means of insert 26 described below.

Each plug ferrule 24 has a mating end 32 shaped to be inserted into the chamber or hole 34 inside receptacle 22 to connect the ends of the two sets of optical fibers. The mating end 32 of each plug ferrule 24 has a flat surface 42, referred to below simply as flat 42. The ends of each set of optical fibers are connected to each ferrule 24 in such manner that they are at predetermined positions relative to flat 42. Flats 42 of the two ferrules 24 are shaped and adapted to contact an internal flat 44 on the inside surface of receptacle 22 facing chamber 34. Internal flat 44 extends through the receptacle on both sides. The mating ends 32 of the two ferrules are inserted into chamber 34 with flats 42 in contact with the internal flat 44 of the receptacle, flats 42 of the two ferrules are aligned, thereby also aligning the ends of the two sets of fibers. The positions of the fibers after the ferrule is inserted into the receptacle are shown more clearly in reference to FIG. 2.

FIG. 2 is an elevational view of the receptacle and ferrule of FIG. 1 together with 4 optical fibers along the lines 2—2 of FIG. 1. As shown in FIG. 2 the 4 optical fibers 52 are forced to the corners of a chamber having a substantially square-shaped cross-section in ferrule 24 near the mating face 54 by insert 26. The four corners of the chamber inside ferrule 24 are at predetermined locations relative to flat 42. In such manner optical fibers 52 are placed at predetermined locations relative to flat 42. In such manner the ends of both sets of optical fibers are terminated to the two ferrules at predetermined locations relative to flats 42. Hence, when the flats 42 of the ferrules are aligned by inserting the mating ends 32 into chamber 34 of receptacle 22 so that the flats 42 and 44 are in contact, the end of each optical fiber in one set is matched with the end of the correct fiber in the other set and futher that the ends of the two matched fibers are aigned to allow maximum light data transmission. In fiber optic connector terminology this is known as polarizing the mating connectors.

To further assist the accurate alignment of fibers, the outside surface of mating ends 32 are each provided with three bosses 56. The three bosses have larger dimensions than the separation between the ferrule and the chamber surface so that, to insert the ferrules into the chamber 34, forces are applied to push them in. The interference between the bosses and the chamber surface causes bosses 56 to act as springs urging the flat surface 42 against the corresponding internal flat 44 of the receptacle to improve the accuracy of alignment of the fibers. The three bosses are spread around the circumference of the mating end 32 to insure that the forces urging the flats 42, 44 together are balanced. In the conventional alignment pin-complementary hole alignment technique, the alignment pin contacts the hole surface typically at only one point which allows the pin to move around in the hole and allows the point of contact between the two to change, giving rise to inaccuracy in aligning the fibers. The three bosses 56 insure that there will be three points of contact between the ferrule 24 and the inside surface of receptacle 22. The three bosses remove the extra space between the ferrule and the surface of chamber 34 and therefore reduce relative movements between the ferrule and the surface of chamber 34 inside receptacle 22. By removing the extra space, rotational movements of the ferrules relative to the receptacle are reduced or even prevented. In the conventional alignment pin-complementary hole arrangement the point of contact between the pin and the whole surface will change depending upon the external force acting on the pin and the hole surface. In connector 20 of FIGS. 1 and 2, however, the three points of contact, namely the contacts between the bosses 56 of ferrule 24 and the surface of chamber 34, will not chamge irrespective of external forces on the connector. This improves the accuracy of alignment despite external forces acting on the connector.

The inside surface of the receptacle at the two ends are designed witha chamfer 58 so that chamber 34 is somewhat enlarged at the two ends of the receptacle to allow an easy entry of the mating ends 34 and bosses 56. The outer edges 59 of the mating faces 54 are also tapered as shown in FIGS. 1–3 to further increase the ease of entry into chamber 34. Bosses 56 do not extend all the way to the mating surface 54 and bosses 56 have curved ends 56a to further assist the ease of entry of the ferrules as shown in FIGS. 1 and 3.

The manner by which the optical fibers are terminated to each of the two plug ferrules will now be described in reference to FIGS. 1–4. As shown in FIGS. 1 and 2 each plug ferrule has a chamber 102 therein which has a substantially square cross-section. Insert 26 fits into chamber 102 to terminate the 4 optic fibers 52 to the ferrule. Insert 26 has two ends 104 and 106. End 104 has a substantially octagonal cross-section with sides 104a and 104b shown more clearly in FIG. 4. Sides 104a are wider than sides 104b at and near end 104 so that the general shape of end 104 of insert 26 resembles a column with a square cross-section with the 4 corners cut off, where the square cross-section is of a size that will cause end 104 to fit snugly into chamber 102 having surfaces 102a. Thus, when end 104 is inserted into chamber 102 surfaces 104a of end 104 will be in contact with the inside surfaces 102a of ferrule 24, thereby filling chamber 102 except for 4 triangular cross-section spaces at the 4 corners of the chamber defined by surfaces 104b and the corner portions of surfaces 102a. These 4 triangular shaped spaces are designed to hold the 4 optical fibers 52 as shown in FIG. 4. The distances between surfaces 104b and 102a are such that fibers 52 are held snugly by friction between the fibers and surfaces 102a and 104b. In such manner the 4 optical fibers 52 are held in predetermined positions in the ferrule relative to flat 42.

Insert 26 tapers from end 104 toward end 106 by increasing the width of surface 104b and decreasing the width of surface 104a. As one progresses from end 104 towards end 106 surfaces 104b also become concave so that end 106 has a substantially cross-shaped cross-section as shown in FIG. 1. Thus, the four spaces defined and bounded by surfaces 104b and 102a also taper but in opposite direction from that of insert 26; these spaces have wider ends near end 106 of the insert and become narrower as one progresses towards end 104. Such spaces are wider at end 106 to facilitate the insertion of the four optical fibers 52. The tapering of insert member 26 and the tapering of the triangular cross-section spaces between surfaces 104b and 102a are also shown in FIG. 3.

After fibers 52 have been inserted in the spaces between insert 26 and surfaces 102a of ferrule 24, the mating ends 32 of the two ferrules are then inserted the chamber 34 of the receptacle to connect the two sets of optical fibers as described above. FIG. 3 is a cross-sectional new of receptacle 22 and the two ferrules 24 showing the positions of the two ferrules after they have been inserted into the receptacle to connect the fibers (not shown). Each ferrules has a shoulder 112 to prevent the ferrule from being inserted too far into the receptacle. As shown in FIG. 3 the distance between shoulders 112 of the two ferrules is greater than the length of receptacle 22 by a distance b so that the shoulders will not hinder the mating faces 54 of the two ferrules from contacting each other, known in the fiber optic connector art as bottoming.

In the preferred embodiment described above three bosses 56 are used as spring elements to urge the two flat surfaces 42, 44 together. It will be evident that a different number of bosses may be used and that the bosses may instead be located on the inside surface of receptacle 22 instead of on the ferrules. All such configurations are within the scope of the invention. It will also be evident that where one set of optical fibers have already been connected to receptacle 22 at predetermined locations relative to the flat surface 44 one of the two ferrules and one coupling nut may be eliminated. Since for one set of fibers the ends of the fibers have been connected in predetermined positions relative to flat 44 and the ends of the other sets of fibers have been connected in predetermined positions relative to flat 42 of the one ferrule used, when the mating end 32 of such ferrule is inserted into chamber 34 of the receptacle with the surfaces 42 and 44 contacting and aligned, each fiber in one set will be connected to the correct fiber in the other set with each pair of fibers aligned for maximum light data transmission. In such manner the connector of FIG. 1 may be adapted for use in wall socket plug-in type connections. All such variations and modifications are within the scope of the invention.

The coupling nuts allow the connector to securely connect two sets of optical fibers. In reference to FIG. 3, end 24a of each ferrule is inserted into hole 28a (FIG. 10 of each coupling nut (shown in phantom in FIG. 3) until the nut abuts shoulder 112. A stop ring or sleeve 122 is attached to the outside surface of end 24a of each ferrule to prevent the nut from slipping out. Alternatively, end 24a may be inserted into a tubing 124 which keeps the coupling nut coupled to the ferrule. Thus to connect each ferrule to the receptacle, the assembled ferrule-coupling nut-stop ring or sleeve assembly is placed close to the receptacle. After the mating ends of the two ferrules have been inserted into receptacle 22 as shown in FIG. 3, the two coupling nuts 28 are then screwed on to the threaded outside surface 114 to prevent the two ferrules from slipping out to complete the assembly of connector 20.

In disconnecting many fiber optic connectors, frequently the optic fibers are pulled to yank the ferrule out of the receptacle. This may cause the fibers to separate from the ferrules and is undesirable. With the structure of the connector of the present invention, the changes for disconnecting the connector by pulling on the fibers are much reduced. To disconnect the ferrules from the receptacle of the present invention, each coupling nut is unscrewed from the threaded outside surface 114. During the unscrewing process, each coupling nut will contact and push against the stop ring or sleeve 122 or tubing 124 away from receptacle 22, causing the mating end of each ferrule to withdraw from chamber 34 of the receptacle. Thus once the nuts are disconnected from the receptacle, the ferrules are either completely or almost completely withdrawn from chamber 34 so that it is unnecessary to pull of the ferules or fibers to disconnect the ferrules from the receptacle.

Instead of using coupling nuts to hold the ferrules and the receptacle together, the dimensions of the bosses 56 may be such as to increase the frictional force between flats 42, 44 and between the bosses and the inside surface of receptacle 22 so that no coupling nut such as nut 28 may be necessary for keeping the two ferrules in place without slipping out. Alternatively, conventional means such as conventional identations and matching protrusions may be used to prevent the two ferrules from slipping out from chamber 34 instead of coupling nuts. All such configurations are also within the scope of the invention.

The ferrule 24 and the insert 26 may be modified for connecting a different number of fibers than 4 in configurations shown in FIGS. 5 and 6. As shown in FIG. 5, chamber 102 inside ferrule 24 may have a substantially pentagonal cross-sectional rather than a square cross-section as in the preferred embodiment shown in FIG. 4. Insert 26 will then have 10 sides 104a and 104b, and the insert again resembles at the mating end a column with a pentagonal cross-section but with the five corners cut off. The five surfaces 104a are again adapted to contact the five inside surfaces 102 of the ferrule and the five remaining surfaces 104b together with the surfaces 102a enclose 5 narrow spaces with substantially triangular cross-sections for holding 5 optical fibers 52. Again the distances between surfaces 104b and 102a are such as to hold the 5 fibers snugly by friction. Alternatively, epoxy may to used to hold the fibers to surfaces 102a, 104b. It will be evident that the chamber 102 inside ferrule 24 may take on shapes having cross-sections in the shape of any polygon with three or more sides for holding and connecting three or more corresponding number of optical fibers.

FIG. 6 is an elevational view of a ferrule inserted into a receptacle from the direction towards the mating face 54, illustrating yet another alternative embodiment for the chamber inside the plug ferrule and for the insert. As shown in FIG. 6 chamber 102 inside ferrule 24 may have a cross-section that is star-shaped instead of in the shape of a polygan. In the embodiment of FIG. 6 the 8 projecting points of the star-shaped feature each represents the line of intersection of two inclined surfaces of the chamber following an angular surface corresponding to the projecting point. Each angular surface is adapted to engage an optical fiber therein. End 104 of insert 26 has a cross-section which is generally octagonal in shape, with the 8 corners cut off to leave 8 indentations 104c for contacting the inside surface of chamber 102. The inclined surfaces of the chamber 102 form 8 protruding portions 102c adapted to fit into the indentations 104c of the insert so that the friction between the two surfaces will cause the insert and the ferrule to be connected snugly. The 8 sides 104d of the insert 26 together with the inside inclined surfaces 102d of ferrule 24 enclose spaces of substantially triangular cross-sections for holding 8 optical fibers 52. In such manner ferrule 24 and insert 26 together may be used to connect two sets of fibers containing 8 fibers each.

If so desired insert 26 may contain another passage 102' and a second insert 26' may be inserted into the passage 102' for holding and connecting 4 fibers 52'. In such configuration the second insert 26' and insert 26 are related in substantially the same manner as insert 26 and ferrule 24 of FIG. 4 and may be used for connecting two sets of fibers 52' each containing 4 fibers. Thus, depending on the sizes of ferrule 24 and insert 26, insert 26 may contain another chamber for an additional second insert. The second insert may yet contain another chamber for a third insert and so on. In such manner a large number of optical fibers may be connected using the connector.

Two sets of fibers whose ends are to be connected may contain fibers of different sizes. As shown in FIG. 7 the set of 4 fibers of different sizes may be accommodated by simply changing the cross-sectional shape of insert element 26 so that the 4 triangular spaces between surfaces 104b and 102a are of different predetermined cross-sections to accommodate 4 fibers of the desired sizes. As also shown in FIG. 7 the cross-section of chamber 102 may be substantially rectangular instead of square in shape. As also shown in FIG. 7, the cross-sectional shape of insert 26 may be other than a regular octagon. Similarly, the pentagonal or star cross-sections of chambers 102 in FIGS. 5 and 6 do not need to be symmetrical or regular in shape. All such configurations are within the scope of the invention.

The constructions of the ferrule and insert assembly for holding the fibers to the ferrule plug is advantageous in that both the ferrule and the insert are easy to manufacture. The inside surfaces of chamber 102 are large surfaces (such as those of FIGS. 4, 5, 6 and 7, large relative to the size of fibers to be connected), and the smaller surfaces requiring closer tolerance on the outside surface of insert 26. The connector does not include any part with small holes therein such as those with diameters of the order of a few hundred microns for holding optical fibers. Connector 20 also allows the fibers to be easily assembled and inserted into the receptacle. Skilled personnel is not required for the assembly and no time consuming alignment procedure is required. The connector may be used repeatedly for connecting and disconnecting multiple fibers easily, conveniently and quickly.

When a connector is used to connect the two ends of two optical fibers it is desirable for the two ends to abut each other to reduce loss of signal through the Fresnel effect. For such purpose one end of a fiber is made flush with a mating surface of one part of the connector and the other end made flush with another mating surface of the other part of the connector so that when the two mating surfaces abut each other the two ends of the fibers will also abut each other. According to conventional fiber optic connection techniques, to insure that the ends of the fibers are flush with mating surfaces, the fibers are cut or polished. The flats 42, 44 and bosses 56 prevent or reduce any rotational motion between receptacle 22 and ferrules 24 and therefore reduce the probability of one of the fiber rubbing the end of another fiber. The probability of scratches caused thereby is thus also reduced.

FIGS. 8A and 8B are partially cross-sectional views and partially elevational views of a ferrule and insert and four optical fibers illustrating a preferred method for connecting optical fibers to the connector. As shown in FIG. 8A, the insert 26 is first inserted into the ferrule 24 until end 104 protrudes from the ferrule. Four optical fibers are then inserted in the four spaces between insert 26 and the inside surface 102a of the ferrule until they also protrude from the ferrule as shown in FIG. 8A. The insert is then pushed back into the ferrule until it is flush with the mating surface 54 as shown in FIG. 8B. The four fibers may be cut along line 140 to make them also flush with mating surface 54. As shown in FIGS. 8A, 8B, the ferrule 24 has a smaller diameter near its mating surface 54 to allow a small section of the ferrule, insert and fibers to be cut or polished away to achieve smooth mating surfaces all in one plane. In the manner described, a number of fibers may be terminated and cut or polished in the ferrule at the same time to save assembly time and labor.

FIGS. 8C and 8D are partially cross-sectional views and partially elevational views of a ferrule and insert and four optical fibers illustrating an alternative method for connecting optical fibers to the connector. As shown in FIG. 8C the mating surface 54 is placed flush with a flat surface 150. The insert 26 is inserted part way into chamber 102. Four optical fibers 52 (only 2 are visible in FIGS. 8C, 8D) are then inserted into the four spaces between insert 26 and the inside surface 102a of the ferrule until their ends are also flush with surface 150. The ends of the fibers have been pre-polished if necessary. Then end 104 of insert 26 is also inserted all the way into chamber 102 until end 104 is also flush with surface 150 as shown in FIG. 8D. In such manner the ends of fibers 52 are connected to the ferrule and insert in such manner that they are flush with the mating surface 54 and ferrule 24 is then ready to be inserted into the receptacle 22 as described above. It is therefore unnecessary to cut any portions of the fibers sticking out from the mating surface 54 or to polish the ends of the fibers to make them flush with mating surface 54.

In the preferred embodiment described above a plurality of optical fibers are terminated to the ferrule so that they are in predetermined positions relative to flat 42 by means of insert member 26. Instead of using an insert member the fibers can also be connected to the ferrule at predetermined positions relative to flat 42 by means of a connector fixture 200 bearing some resemblance to the receptacle 22 of FIG. 1. As shown in FIG. 9 fixture 200 encloses a chamber 234. The inside surface of fixture 200 has a flat portion 244. FIG. 10 is an elevational view of a ferrule 224 whose outside surface is essentially the same as ferrule 24 of FIG. 1. For this reason the parts of ferrule 224 similar to those of ferrule 24 are identified by the same numerals. Thus, ferrule 224 has a flat surface 42 and three bosses 56. Ferrule 224 is adapted to hold 7 optical fibers and for connecting the ends of such 7 fibers to the ends of another set of 7 fibers. Ferrule 224 defines 7 holes 252 therein for holding the 7 optical fibers. Holes 252 have diameters that are somewhat larger than the optical fibers to be held therein. Thus, when the 7 fibers are inserted in the holes 252 the 7 fibers may still move to some extent relative to flat 42. If at such point the 7 fibers are secured to ferrule 224 by means of an adhesive the fibers will not be accurately aligned relative to flat 42, since holes 252 are too large to precisely define the positions of the fibers relative to flat 42. While it is possible to manufacture a ferrule whose holes therein are just being enough for the fiber and are acourately positioned relative to flat 42, the manufacture of such ferrule may require very precise tooling of molding parts for making the ferrule. Furthermore, the connection between the fibers and holes 252 will be a very tight fit so that special assembly techniques may be required to insert the fibers into the holes. For these reasons it may be desirable to manufacture ferrules whose holes therein for holding the fibers are somewhat larger than the fibers so that the fibers are not precisely aligned with respect to flat 42. The align the fibers with respect to flat 42, an alignment fixture is used instead.

Since holes 252 are somewhat larger than the fibers, the fibers are not precisely aligned relative to flat 42 even after they have been inserted into the holes. It is necessary to further align the fibers by means of fixture element 200. Surface 254 and the portion of fixture element 200 underneath the surface define 7 holes 256 therein. Fixture element 200 has been manufactured so that holes 256 are at precisely predetermined locations with respect to flat 244 and are precisely aligned with respect to the flat surface. Mating end 32 of ferrule 224 is shaped so that it fits into chamber 234 of the fixture element in a manner simliar to its fitting into chamber 34 of receptacle 22 of FIG. 1. After the mating end 32 is inserted into the chamber 234, bosses 56 again act as spring elements urging the two flat surfaces 42 and 244 together thereby aligning surface 42 with surface 244.

FIGS. 11A, 11B and 11C are cross-sectional views of the fixture element 200 and the ferrule 224 in different relative positions taken along the lines 11—11 in FIGS. 9 and 10. After the mating end 32 has been inserted into chamber 234 of the fixture element has shown in FIG. 11A, 7 optical fibers 52 are then inserted into holes 252. As shown in FIG. 11A holes 252 have been enlarged as one progresses away from the mating surface 54 towards shoulder 112 to facilitate the insertion of the fibers. Fibers 52 are then inserted beyond holes 252 to enter holes 256 of the fixture element as shown in FIG. 11A. Once the fibers enter holes 256 the portions of the 7 fibers near the mating end 54 will then be aligned accurately relative to flat 244 of the fixture element. Since flats 244 and 42 have been aligned when the mating end 32 is inserted into chamber 234, the portions of fibers 52 at and near the mating face 54 and then precisely aligned relative to flat 42 of the ferrule. An adhesive material 258 is then injected into holes 252 to securely connect the fibers to the ferrule in their precisely aligned positions. After the epoxy has been cured the mating end 32 is then withdrawn from chamber 234 as shown in FIG. 11C. The fixture element is coated with a release agent such as teflon so that the epoxy will not prevent the mating end from being withdrawn. Portions of fibers 52 will protrude out from the mating surface 54. By cutting the fibers along the dotted line 260 or by using a conventional polishing fixture, fibers 52 may be made to end flush with mating surface 54. In such manner fibers 52 are connected to ferrule 224 in precisely aligned positions with respect to flat 42.

As discussed above the precise alignment of optical fibers with respect to a referenced surface on the ferrule is important for the accurate alignment of fibers to be connected. For this reason it is desirable for the connector and the ferrule to be fabricated from a material so that the connector will undergo minimum changes in dimensions when subjected to temperature extremes to reduce any misalignments caused by temperature changes. A suitable material for the connector and ferrule is filled polyester or polypropylene sold under the trademark (VALOX) of General Electric or the trademark (MARLEX) of Phillips Petroleum. A suitable type of adhesive is epoxy sold under the trademark (TRA BOND F230) or (TRA BOND F120) of TRA-CON, Inc.

As shown in FIGS. 1 and 3 the insert member 26 is longer than the ferrule 24 so that a portion of end 106 protrudes from the ferrule after the connector assembly has been completely assembled as shown in FIG. 3. The protruding end 106 of the insert also provides a concave surface 104b for guiding the end of an optic fiber when the end is to be inserted into chamber 102 between the ferrule and the insert 26. The process of connecting the fibers to the ferrule is thereby facilitated.

The above description of method and structure used is merely illustrative thereof, and various changes in shapes, sizes, materials or other details of the method and construction may be within the scope of the appended claims.

It is claimed:

1. A connector for connecting a first and a second group of optical fibers in axial alignemnt, comprising:
receptacle means having therein a bore, the surface of said bore at one end of the bore defining a first surface, and the surface of said bore at the other end defining a third surface, each of said first and third surfaces comprising a curved portion and only one substantially flat reference surface portion;
first plug means having a mating portion shaped to fit into the end of the bore of the receptacle means having the first surface, the outside surface of the mating portion of the plug means defining a second surface, said second surface comprising a curved surface portion of a shape substantially similar to that of the curved portion of the first surface and only one substantially flat reference portion shaped to contact the reference portion of the first surface when the mating portion of the plug means is inserted into the bore, said first plug means adapted for connection with a first group of one or more optical fibers so that the ends of the fibers in the first group are substantially fixed in position relative to the reference portion of the second surface, one of the curved portions of the first and second surfaces having one or more bosses thereon for contacting the other curved portion, wherein one boss is located so that when the mating portion is inserted into the bore, the two reference portions will contact and be urged against each other to connect the first group of fibers to the receptacle means so that the fibers are in selected positions relative to the reference portion of the first surface; and
a second plug means having a mating portion shaped to fit into the other end of the bore, the outside surface of the mating portion of the second plug means defining a fourth surface which includes a flat portion shaped to contact the flat portion of the third surface, said second plug emans adapted for connection with the second group of one or more optical fibers so that the ends of the fibers in the second group are substantially fixed in position relative to the flat portion of the fourth surface, one of the third and fourth surfaces having one or more bosses thereon for contacting the other of the third and fourth surfaces wherein one of the bosses on the third or fourth surface is located so that when the second plug means is inserted into the other end of the bore, the flat portions of the third and fourth surfaces will contact and be urged against each other to connect the second plug means to the receptacle means, the relative orientations of the flat portions of the first and third surfaces of the bore being such that each of the ends of one or more fibers in the first group is aligned with an end of a fiber in the second group;
whereby the connector permits the two groups of fibers to be repeatedly disconnected and then reconnected while maintaining substantially the alignment of the fibers when re-connected.

2. The connector of claim 1, wherein the flat portions of the first and third surfaces are substantially in the same plane.

3. The connector of claim 1, wherein each plug means has a mating portion or end adapted to be inserted into the bore and another end, each plug means having a shoulder at an intermediate location between the mating end and the other end so that only the mating end up to the shoulder is insertable into the receptacle means, the sum of the shoulder-to-mating end distances of the two plug means being greater than the length of the bore so that the two plug means will bottom unhindered by the shoulder, the ends of both groups of fibers being substantially flush with the respective contacting surface of the plug means to reduce loss of light signal transmission.

4. The connector of claim 1, wherein said receptacle means has an outside surface which is threaded, wherein the two plug means each has a mating portion or end adapted to be inserted into the bore and another end, each plug means having a shoulder at an intermediate location between its two ends, said connector further comprising:
two coupling nuts each complementarily threaded with the outside surface of the receptacle means for securely coupling the two plug means to the receptacle means, said nuts each having a passage therein through which the other end of the corresponding plug means may be inserted; and two stopper members each connected to the outside surface of the corresponding plug means between the shoulder and the other end and for retaining the coupling nut after one of the two plug means has been inserted into the passage of the corresponding nut until the nut is adjacent to the shoulder, so that when the corresponding coupling nut is unscrewed from the receptacle means, the nut will push the corresponding plug means away from the receptacle means to withdrawn the mating end of such plug means from the receptacle means.

5. The connector of claim 1, wherein the bosses are of such dimensions and material that the frictional force between the bosses and the surface contacted by the bosses when the plug means is inserted into the bore couples the plug means securely to the receptacle means.

6. The connector of claim 1, wherein each of the two plug means comprises:

a ferrule member having therein a passage formed by surfaces, the cross-section of the passage being star-shaped, wherein the projecting points of the star-shape each represents the line of intersection of two inclined surfaces of the passage, said two inclined surfaces forming an angular surface corresponding to the projecting point, each angular surface engaging an optical fiber therein, said ferrule member having one end which is the mating portion of the plug means, wherein one portion of the outside surface of said end is the reference portion of the plug means;

an insert member shaped to fit into the passage, the surface of the insert member facing the passage having two types of surfaces, each surface of the first type corresponding to each angular surface and for engaging the optical fiber when the insert member has been inserted into the passage, the second type of surfaces for engaging the surfaces of the passage, said first type of surfaces for urging the fibers against the corresponding angular surfaces, so that when an optical fiber has been inserted into the space between each angular surface and the corresponding surface of the first type, the fibers are substantially fixed in position relative to the reference portion of the plug means;

wherein a portion of said ferrule member is the mating portion of the first or second plug means which is shaped to fit into one end of the bore of the receptacle means, so that when the ferrule member is inserted into the receptacle means and when a fiber is fixed in position relative to an angular surface of the ferrule member, the fiber is fixed in a desired position relative to one of the two reference surface portions of the receptacle means.

7. The connector of claim 1, wherein each of the two plug means comprises:

a ferrule member having therein a passage whose cross-section is substantially in the shape of a polygon having three or more sides, wherein the corners of the polygon each represents the line of intersection of two inclined surfaces of the passage, said two inclined surfaces forming an angular surface for engaging an optical fiber therein, said ferrule member having one end which is the mating portion of the plug means, wherein one portion of the outside surface of said end is the reference portion of the plug means;

an insert member shaped to fit into the passage, the surface of the insert member facing the passage having two types of surfaces, with each of a first type of surfaces corresponding to each angular surface and for engaging the optical fiber when the insert member has been inserted into the passage, and the second type of surfaces for engaging the surface of the passage, said first type of surfaces for urging the fibers against the corresponding angular surfaces, so that when an optical fiber has been inserted into the space between each angular surface and the corresponding surface of the first type, the fibers are substantially fixed in position relative to the reference portion of the plug means;

wherein a portion of said ferrule member is the mating portion of the first or second plug means which is shaped to fit into the bore of the receptacle means, so that when the ferrule member is inserted into the receptacle means and when a fiber is fixed in position relative to an angular surface of the ferrule member, the fiber is fixed in a desired position relative to one of the two reference surface portions of the receptacle means.

8. An optical fiber connector member for use in a connector for connecting a first and a second group of fibers, said connector including a receptacle having a first reference surface thereon, said first reference surface serving as a reference for aligning the two groups of fibers, said connector member comprising:

a ferrule member defining a bore therein, said bore having a second reference surface, wherein said member defines therein a passage whose cross-section is substantially in the shape of a poygon having three or more sides, wherein the corners of the polygon each represents the line of intersection of two inclined surfaces of the passage, said two inclined surfaces forming an angular surface for engaging an optical fiber therein; and an insert member shaped to fit into the passage, the surface of the insert member facing the passage having two types of surfaces, with each of a first type of surfaces corresponding to each angular surface and for engaging the optical fiber when the insert member has been inserted into the passage, and the second type of surfaces for engaging the surface of the passage, said first type of surfaces for urging the fibers against the corresponding angular surfaces, so that when an optical fiber has been inserted into the space between each angular surface and the corresponding surface of the first type, the fibers are substantially fixed in position relative to the second reference surface of the ferrule member;

wherein said ferrule member is adapted to be connected to the receptacle in such manner than the relative positions of the two reference surfaces are predetermined, so that when the ferrule member is so connected to the receptacle and when a fiber is fixed in position relative to an angular surface of the ferrule member, the fiber is fixed in position relative to the first and second reference surfaces.

9. The connector member of claim 8, wherein the cross-section of the pasage is substantially square in shape.

10. The connector member of claim 9, wherein the insert member has an octagonal shape at one end and a cross shape at the other end.

11. An optical fiber connector member for use in a connector for connecting a first and a second group of fibers, said connector including a receptacle having a first reference surface thereon, said first reference surface serving as a reference for aligning the two groups of fibers, said connector member comprising:

a ferrule member defining a bore therein, said bore having a second reference surface, wherein said member defines therein a passage formed by surfaces including inclined surfaces, whose cross-section is star-shaped, wherein the projecting points of the star-shape each represents the line of intersection of two inclined surfaces of the passage, said two inclined surfaces forming an angular surface corresponding to the projecting point, each angular surface engaging an optical fiber therein; and an insert member shaped to fit into the passage, the surface of the insert member facing the passage having two types of surfaces, each surface of the first type corresponding to each angular surface and for engaging the optical fiber when the insert member has been inserted into the passage, the second type of surfaces for engaging the surfaces of the passage, said first type of surfaces for urging the fibers against the corresponding angular surfaces, so that when an optical fiber has been inserted into the space between each angular surface and the corresponding surface of the first type, the fibers are substantially fixed in position relative to the second reference surface of the ferrule member;

wherein said ferrule member is adapted to be connected to the receptacle in such manner that the relative positions of the two reference surfaces are predetermined, so that when the ferrule member is so connected to the receptacle and when a fiber is fixed in position relative to an angular surface of the ferrule member, the fiber is fixed in position relative to the first and second reference surfaces.

12. A positioning fixture member for positioning one or more optical fibers with respect to a substantially flat reference portion of an outside surface of a housing defining a first surface, said first surface comprising a curved surface portion and only one flat portion, said fixture member having a bore for receiving the housing, wherein the surface of the bore defines a second surface surrounding and engaging the first surface when the housing has been inserted into the bore, said second surface also comprising a curved surface portion and only one substantially flat reference portion for contacting the flat portion of the first surface when the two surfaces are engaged, the curved portion of one of the two surfaces having one or more bosses thereon, wherein a first boss is located for urging the two portions toward each other when the housing is inserted into the fixture member, said fixture member having passages therein for holding and aligning the one or more optical fibers relative to the flat portion of the fixture member, said housing defining therein passages for holding the optical fibers, such that when the optical fibers have been inserted into the passages in the housing and the housing and the optical fibers have been inserted respectively into the bore and the passages of the fixture member, the fibers are placed at predetermined positions relative to the reference portion of the first surface of the housing.

13. A method of connecting a group of optical fibers in axial alignment with respect to a ferrule member of a fiber optic connector which includes (a) a ferrule member having therein a passage and whose cross-section is star-shaped, wherein the projecting points of the star-shape each represents the line of intersection of two inclined surfaces of the passage, said two inclined surfaces forming an angular surface corresponding to the projecting point, each angular surface engaging an optical fiber therein, said ferrule member having a mating end for engaging a connector component to connect the fibers, said mating end having a reference surface portion on its outside surface; and (b) an insert member shaped to fit into the passage, the surface of the insert member facing the passage having two types of surfaces, each surface of the first type corresponding to each angular surface and for engaging the optical fiber when the insert member has been inserted into the passage, the second type of surfaces for engaging the surfaces of the passage, so that when an end of an optical fiber is inserted into the space between each angular surface and the corresponding surface of the first type, the end is substantially fixed in a selected position relative to the reference surface portion, the first type of surfaces being tapered from one end of the insert member to the other end so that the spaces between each such surface and the corresponding angular surface of the passage are also tapered and have narrower openings at the mating end than the other end of the ferrule member, the dimensions of the narrower ends of said spaces being such that frictional forces between the fibers and the corresponding angular surfaces and the surfaces of the first type of the insert are adequate for securing the fibers to the ferrule member, said method comprising:

inserting the insert member into the passage in the ferrule member at the other end of the ferrule member until the insert member protrudes beyond the mating end;

inserting an optical fiber into the wider end of a space between an angular surface and the corresponding surface of the first type until it protrudes beyond the mating end; and pushing the protruding end of the insert member back into the passage until it is substantially flush with the mating end so that the fiber is secured to the ferrule member and fixed in a selected position relative to the reference surface portion of the ferrule member.

14. A method for connecting a group of optical fibers in axial alignment with respect to a ferrule member of a fiber optical connector which includes (a) a ferrule member having therein a passage and whose cross-section is in the shape of a polygon wherein the corners of the polygon each represents the line of intersection of two inclined surfaces of the passage, said two inclined surfaces forming an angular surface, each angular surface engaging an optical fiber therein, said ferrule member having a mating end for engaging a connector component to connect the fibers, said mating end having a reference surface portion on its outside surface; and (b) an insert member shaped to fit into the passage, the surface of the insert member facing the passage having two types of surfaces, each surface of the first type corresponding to each angular surface and for engaging the optical fiber when the insert member has been inserted into the passage, the second type of surface for engaging the surfaces of the passage, so that when an optical fiber has been inserted into the space between each angular surface and the corresponding surface of the first type, the fiber is substantially fixed in a selected position relative to the reference surface portion, the first type of surface being tapered from one end of the insert member to the other end so that the spaces between each such surface and the corresponding angular surface of the passage are also tapered and have narrower openings at the mating end than the other end of the ferrule member, the dimensions of the narrower ends of said spaces being such that frictional forces between the fibers and the corresponding angular surfaces and the surfaces of the first type of the insert member are adequate for securing the fibers to the ferrule member, said method comprising:

inserting the insert member into the passage in the ferrule member at the other end of the ferrule member until the insert member protrudes beyond the mating end;

inserting an optical fiber into the wider end of a space between an angular surface and the corresponding surface of the first type until the fiber protrudes beyond the mating end; and pushing the protruding end of the insert member back into the passage until it is substantially flush with the mating end, so that the fiber is secured to the ferrule member and substantially fixed in the selected position relative to the reference surface portion.

15. A method for connecting a group of optical fibers in axial alignment with respect to a ferrule member of a fiber optic connector which includes (a) a ferrule member having therein a passage and whose cross-section is star-shaped, wherein the projecting points of the star-shape each represents the line of intersection of two inclined surfaces of the passage, said two inclined surfaces forming an angular surface corresponding to the projecting point, each angular surface engaging an optical fiber therein, said ferrule member having a mating end for engaging a connector component to connect the fibers, said mating end having a reference surface portion on its outside surface; and (b) an insert member shaped to fit into the passage, the surface of the insert member facing the passage having two types of surfaces, each surface of the first type corresponding to each angular surface and for engaging the optical fiber when the insert member has been inserted into the passage, the second type of surfaces for engaging the surfaces of the passage, so that when a fiber has been inserted into the space between an angular surface and the corresponding surface of the first type, the fiber is substantially fixed in a selected position relative to the reference surface portion, the first type of surfaces being tapered from one end of the insert member to the other end so that the spaces between each such surface and the corresponding angualr surface of the passage are also tapered and have narrower openings at the mating end than the other end of the ferrule member, the dimensions of the narrower ends of said spaces being such that frictional forces between the fibers and the corresponding angular surfaces and the surfaces of the first type of the insert member are adequate for securing the fibers to the ferrule member, said method comprising:

placing the mating end of the ferrule member against a substantially flat surface;

inserting the insert member into the passage in the ferrule member at the other end of the ferrule member until the insert member is at a distance from the flat surface;

inserting an optical fiber into the space between an angular surface and the corresponding surface of the first type until it is in contact with the flat surface; and inserting the insert member further into the passage until it is in contact with the flat surface, so the the fiber is secured to the ferrule member and the end of the fiber in contact with the flat surface is substantially fixed in the selected position relative to the reference surface portion.

16. A method for connecting a group of optical fibers in axial alignment with respect to a ferrule member of a fiber optic connector which includes (a) a ferrule member having therein a passage and whose cross-section is in the shape of a polygon wherein the corners of the polygon each represents the line of intersection of two inclined surfaces of the passage, said two inclined surfaces forming an angular surface, each angular surface engaging an optical fiber therein, said ferrule member having a mating end for engaging a connector component to connect the fibers, said mating end having a reference surface portion on its outside surface; and (b) an insert member shaped to fit into the passage, the surface of the insert member facing the passage having two types of surfaces, each surface of the first type corresponding to each angular surface and for engaging the optical fiber when the insert member has been inserted into the passage, the second type of surface for engaging the surfaces of the passage, so that when a fiber has been inserted into the space between an angular surface and the corresponding surface of the first type, the fiber is substantially fixed in a selected position relative to the reference surface portion, the first type of surfaces being tapered from one end of the insert member tp the other end so that the spaces between each such surface and the corresponding annular surface of the passage are also tapered and have narrower openings at the mating end that the other end of the ferrule member, the dimensions of the narrower ends of said spaces being such that frictional forces between the fibers and the corresponding angular surfaces and the surfaces of the first type of the insert member are adequate for securing the fibers to the ferrule member, said method comprising:

placing the mating end of the ferrule member against a substantially flat surface;

inserting the insert member into the pasasge in the ferrule member at the other end of the ferrule member until the insert member is at a distance from the flat surface;

inserting an optical fiber into the space between an angular surface and the corresponding surface of the first type until it is in contact with the flat surface; and inserting the insert member further into the passage until it is in contact with the flat surface, so that the fiber is secured to the ferrule member and the end of the fiber in contact with the flat surface is fixed in the selected position relative to the reference surface portion.

17. A method for connecting two groups of optical fibers using a device so that they may be easily disconnected and reconnected repeatedly, said device including a receptacle means and a first and a second plug means, said receptacle means defining a bore therein, the surface of one end of the bore defining a first surface and the surface of the other end of the bore defining a second surface, each of said first and second surfaces comprising a curved portion and only one substantially flat reference surface portion, each of the two plug means having a mating end shaped to fit into one of the two ends of the bore, each mating end having an outside surface comprising a curved surface portion and a substantially flat reference surface portion adapted to contact respectively the curved and flat surface portions of the corresponding end of the bore when the two mating ends are inserted therein with the curved surface portions forming two matching pairs of curved portions and the flat reference surface portions forming two matching paris of reference surface portions, the first and the second plug means adapted to be secured to the first and second groups of fibers respectively so that the fibers in each group are located in selected positions relative to the reference surface portion of the plug means to which they are secured, one of the curved surface portions in each of the two matching pairs of curved surface portions having one or more bosses thereon located so that each pair of reference surface portions is urged against each other when the corresponding mating end is inserted into the bore, so that the two reference surface portions of the two plug means are each in selected positions relative to the reference surface portions of the first and second surfaces, and so that at least some of the fibers in the first group are accurately aligned with some of the fibers in the second group, said method comprising:

securing the first and second groups of fibers respectively to the first and second plug means so that each group of fibers are in selected positions relative ot the reference surface portion of the corresponding plug means; and inserting the two plug means into the two ends of the bore in the receptacle means to connect and accurately align at least some of the fibers in the two groups.

* * * * *

UNITED STATES PATENT AND TRADEMARK OFFICE
CERTIFICATE OF CORRECTION

PATENT NO. : 4,712,864

DATED : Dec. 15, 1987

INVENTOR(S) : Ellis et al.

It is certified that error appears in the above-identified patent and that said Letters Patent is hereby corrected as shown below:

```
Col. 11, line 51:   "alignemnt" should be --alignment--;
Col. 12, line 21:   "emans" should be --means--;
         line 55:   "shoulder," should be --shoulders,--;
Col. 13, line 13:   "withdrawn" should be --withdraw--;
Col. 14, line 59:   "than" should be --that--;
         line 67:   "pasage" should be --passage--;
Col. 16, line  1:   "method of" should be --method for--;
         line 33:   insert --member-- between "insert" and "are";
         line 52:   "optical" should be --optic--;
         line 67:   "surface" should be --surfaces--;
Col. 17, line  5:   "surface" should be --surfaces--;
         line 56:   "angualr" should be --angular--;
Col. 18, line  8:   "the the" should be --that the--;
         line 30:   "surface" should be --surfaces--;
         line 37:   "tp" should be --to--;
         line 38:   "annular" should be --angular--;
         line 40:   "that" should be --than--;
         line 49:   "pasasge" should be --passage--;
Col. 19, line 12:   insert --surface-- between "curved" and
                    "portions";
         line 14:   "paris" should be --pairs--; and
Col. 20, line 14:   "ot" should be --to--.
```

Signed and Sealed this

Seventeenth Day of May, 1988

*Attest:*

DONALD J. QUIGG

*Attesting Officer*    *Commissioner of Patents and Trademarks*